United States Patent [19]

Chatham

[11] Patent Number: 4,581,156
[45] Date of Patent: Apr. 8, 1986

[54] CONTROL OF FOAM FORMATION IN THE MANUFACTURE OF WET PROCESS PHOSPHORIC ACID

[75] Inventor: Douglas M. Chatham, Athens, Ga.

[73] Assignee: United States Steel Corporation, Pittsburgh, Pa.

[21] Appl. No.: 677,616

[22] Filed: Dec. 3, 1984

[51] Int. Cl.$^4$ .............................................. B01D 19/04
[52] U.S. Cl. .................................. 252/321; 252/358; 423/320
[58] Field of Search ................. 252/321, 358; 210/708

[56] References Cited

U.S. PATENT DOCUMENTS

| | | | |
|---|---|---|---|
| 2,390,212 | 12/1945 | Fritz | 252/358 X |
| 3,437,437 | 4/1969 | Dorwart | 252/358 X |
| 3,756,959 | 9/1973 | Vitalis et al. | 252/358 X |
| 3,761,423 | 9/1973 | Hey et al. | 252/321 X |
| 3,793,223 | 2/1974 | Lichtman et al. | 252/321 X |
| 4,065,403 | 12/1977 | Satterwhite et al. | 252/321 X |
| 4,065,404 | 12/1977 | Satterwhite et al. | 252/321 X |

FOREIGN PATENT DOCUMENTS 93213 12/1977 Poland .

OTHER PUBLICATIONS

Phosphoric Acid Bid Comparison by J. Mayers.

*Primary Examiner*—Richard D. Lovering
*Attorney, Agent, or Firm*—William L. Krayer

[57] ABSTRACT

Significant improvements in defoaming in a wet-process phosphoric acid reactor are obtained by adding to the reactor during the digestion process both a surfactant defoamer and a polyacrylamide.

7 Claims, 2 Drawing Figures

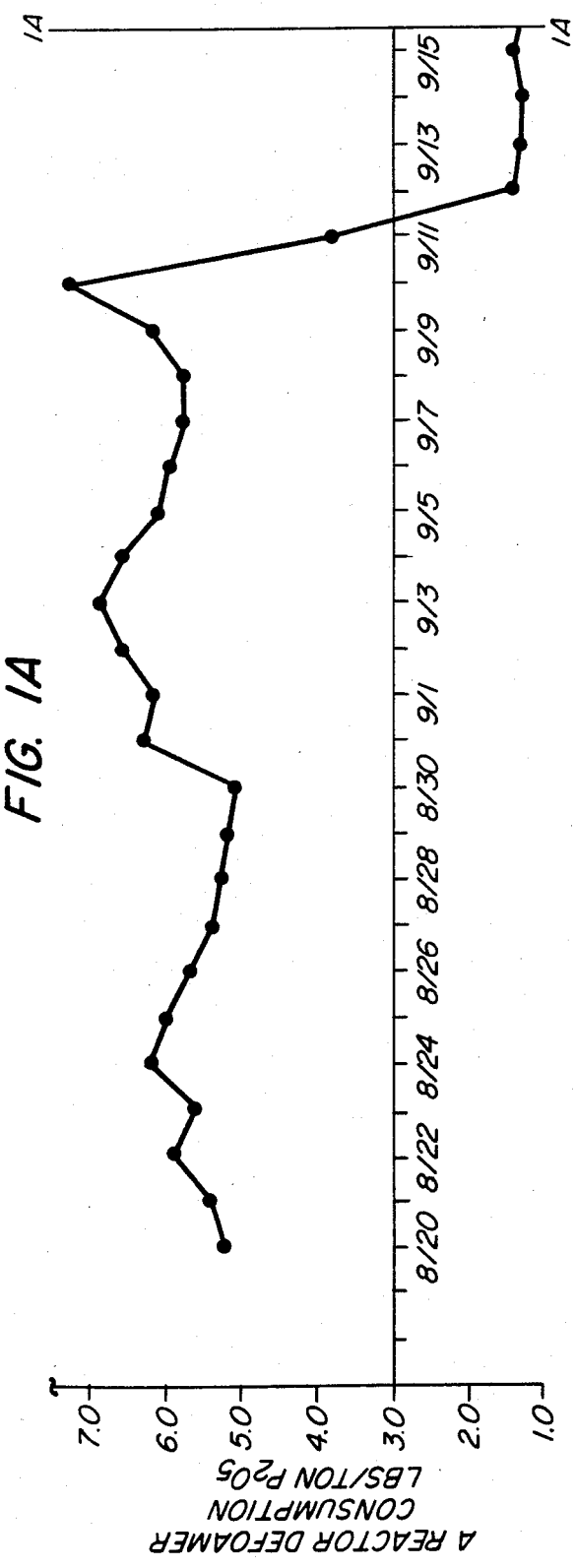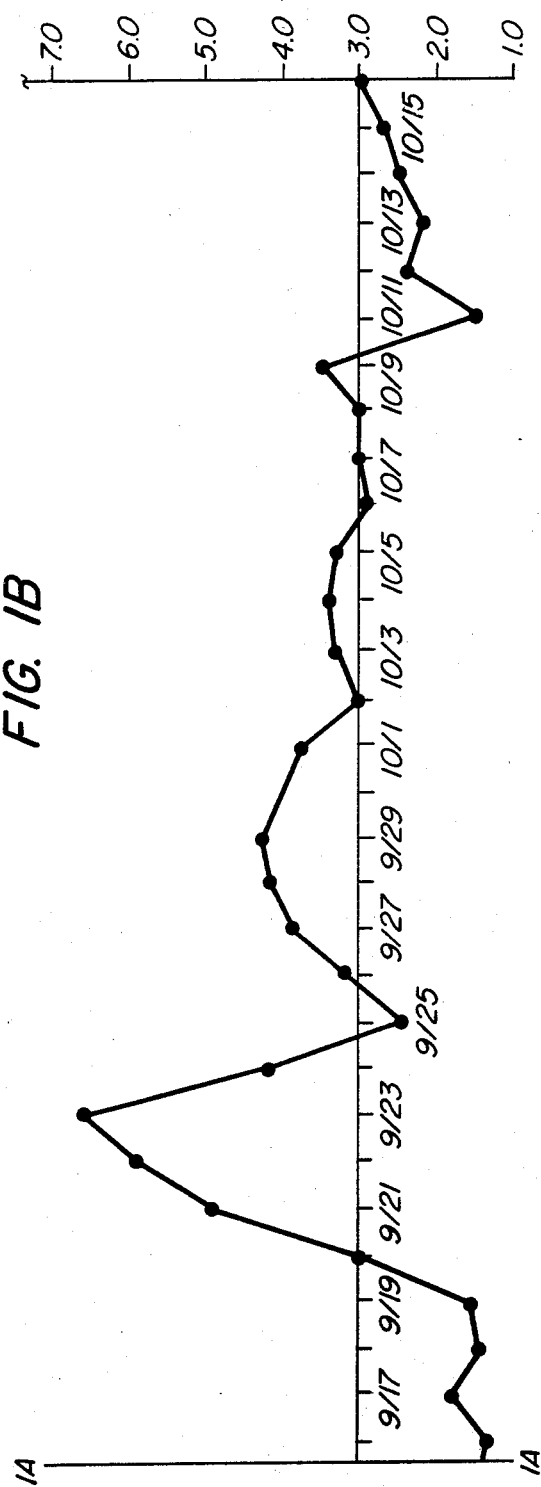
FIG. 1A
FIG. 1B

CONTROL OF FOAM FORMATION IN THE MANUFACTURE OF WET PROCESS PHOSPHORIC ACID

BACKGROUND OF THE INVENTION

The manufacture of phosphoric acid for use in fertilizer is conducted for the most part by the wet-process, in which phosphate ore is reacted with aqueous sulfuric acid to produce a mixture of gypsum and phosphoric acid. The wet phosphoric acid process is typically characterized by copious foam formation. If untreated, the foam reduces capacity of the equipment and occasionally results in expensive overflows.

Various defoaming agents have been used to control foaming in the process, including surface active agents (surfactants), such as tall oil, tall oil fatty acids, oleic acid, sulfated fatty acids, sulfated oleic acid, hydroxylamine adducts of tall oil, hydrogen iodide adducts of fatty amines, ethylene oxide adducts of tall oil, and long chain alcohols. The defoamers used in most commercial plants are tall oils, fatty acids, sulfonated tall oils, and sulfonated fatty acids. For example, U.S. Pat. No. 3,437,437 to Dorwart discloses the use of the reaction product of one mole of a hydroxylamine and 1 to 4 moles of fatty acid. U.S. Pat. Nos. 3,653,827 and 3,761,423 to Hey et al disclose the use of the amide reaction product of a lower alkanol amine and fatty acid in a mixture with fatty acid. Japanese Patent No. 77 97,385 to N. Watanabe, Aug. 16, 1977, describes the use of mixtures of hydroxypropyl esters of straight-chain and branched fatty acids. U.S. Pat. Nos. 3,594,123 and 3,671,461 to Encke et al disclose the use of ethylene oxide adducts of tall oil with or without fatty acids. U.S. Pat. No. 3,238,142 to Perry describes the use of a major amount of a conventional defoaming agent such as tall oil, red oil, fuel oil or pine oil, with a minor amount of an ethoxylated alkanol containing from 4 to 6 ethylene oxide residues per molecule. U.S. Pat. No. 3,598,755 to McBroom et al describes the use of a mixture of an alcohol of 16 or more carbons and a butylene oxide capped ethoxylated alcohol made from an alcohol of 10 or more carbons. U.S. Pat. Nos. 4,065,402, 4,065,403, and 4,065,404 to Satterwhite et al disclose the use of a sulfonated tall oil mixed with a long chain alcohol, a nonionic additive (polyoxyalkene alkyl ether), or both. U.S. Pat. No. 3,578,402 to Riggs, Jr. discloses the use of the reaction product of hydrogen iodide and a high molecular weight organic amine. U.S. Pat. No. 4,083,936 to Woodward describes the use of aqueous emulsions containing alkyl phosphates and polyphosphates such as the product of the reaction between octyl alcohol production still residues with polyphosphoric acid.

As is known in the art, surfactants or surface active agents, which may be considered generic terms for all the above described compositions, derive their name from the fact that they contain both hydrophilic groups and hydrophobic groups; thus, in an aqueous medium, the hydrophilic moiety is attracted to the water and the hydrophobic moiety is repelled by it. The surfactant therefore tends to inhabit the surface of water, and if the surface is an interface with a material attractive to the hydrophobic moiety, the surfactant is all the more likely to affect the interface of the two materials. For my purposes herein, a defoamer is a surfactant which has the ability to inhibit foam formation or destroy foam by altering the surface tension of foam and bubbles or the materials in them.

Polyacrylamide has been used in various contexts in the phosphoric acid industry and the fertilizer industry which employs the phosphoric acid. See, for example, Hill U.S. Pat. No. 4,222,879, describing the clarification of the finished phosphoric acid by polyacrylamide addition in a settler. Phosphoric acid is freed of humic matter by Symens et al in U.S. Pat. No. 4,263,148, in a process which subsequently encourages the generation of froth. See also Lopez et al U.S. Pat. No. 4,402,920. Ammonium phosphate solutions made from wet process phosphoric acid are clarified by various water-soluble acrylamide polymers including cationic copolymers, in Dobry's U.S. Pat. No. 4,354,944; a sequential addition is disclosed in his U.S. Pat. No. 4,354,943. See also U.S. Pat. Nos. 2,968,528, 3,099,622, 3,644,091, 3,796,790, and 4,437,997. The addition of polyacrylamide to the filter cake (comprising primarily gypsum) in a wet process facility to prevent scale formation on the filter is disclosed by Harper et al in British Patent No. 1,401,682.

The reader will also be interested in British Patent No. 1,113,922, which employs polyacrylamide to clarify wet process phosphoric acid for filtration, with incidental foam-combatting effects and Polish Patent No. 93,213, which, according to a summary we have seen, discloses the use of small amounts of polyacrylamide for controlling foam where the $SO_4^{3-}$ content of the reaction mixture is 1–2.5%.

Activated carbon has been used to remove organic materials in a phosphoric acid slurry and thus reduce the tendency to form foam—see U.S. Pat. No. 3,122,415.

SUMMARY OF THE INVENTION

This invention provides protection against foam in the wet-process phosphoric acid reaction which (a) is more economical and effective than conventional defoaming techniques and (b) allows production of an acid with less colloidal organic material, that is, a lighter colored acid. The above improvements are achieved by means of a combination anti-foaming agent comprising a mixture of a polyacrylamide and a relatively small amount of a defoamer surfactant, such as a sulfated fatty acid. By polyacrylamide, I mean a water-soluble polymer of acrylamide having a molecular weight of at least one million and comprising at least about 75% acrylamide monomer and the balance copolymerizable water-soluble monomers such as acrylic acid. The term polyacrylamide generally includes homopolymers of acrylamide which have been hydrolyzed by known techniques to convert up to 25% or more of the amide groups to carboxylic acid groups, although I prefer not to exceed about 10% hydrolysis, and in fact my preference is to employ essentially nonionic, i.e. unhydrolyzed, homopolymers of acrylamide having a molecular weight of at least about 15 million. I do not intend to include in the term polyacrylamide polymers containing significant amounts of cationic groups such as may be included, for example, by the copolymerization of acrylamide with significant amounts of dimethyl diallyl ammonium chloride. My invention is particularly effective and useful in the so-called isothermal variation of wet-process phosphoric acid manufacture, which employs a closed reactor equipped with an agitator and, typically, the application of a vacuum, together with more or less continuous addition of sulfuric acid and withdrawal of gypsum-containing slurry.

FIG. 1 shows the consumption of defoamer in a commercial reactor line with and without the addition of a small amount of polyacrylamide.

In the synthesis of phosphoric acid generally by the "wet-process", phosphate rock is digested under agitation in sulfuric acid in a reactor which may or may not be subject to vacuum. Foam is formed in this process by the evolution of large quantities of $CO_2$ and $SiF_4$ gases and by the entrainment of air into the slurry. Occasionally the reaction generates a gross disturbance caused by an eruption of gases which may carry over large quantities of incompletely reacted materials into the vapor condensing system, waste disposal system, or other appurtenant apparatus, a very costly event which may be correlated (although I am not certain that there is an etiological correlation) to the presence of foam.

The foam may be partially stabilized, i.e. collapsed, by the addition of an appropriate amount of one of the various types of surfactants recited herein. Conventional defoamers function by altering the surface tension of the liquid, which destabilizes the foam. Polymeric flocculants have been widely used to agglomerate solids suspended in many liquid systems (water treatment, phosphoric acid clarification, etc.) which allows them to settle. In the practice of this invention, the polymeric flocculant agglomerates the organic materials (and other colloidal solids) and, I believe, "ties" them to the gypsum, removing the combination from the surface of the liquid and preventing the incipent formation of foam.

The polyacrylamide I use is, as previously described, a high molecular weight (at least one million, and up to twenty million or more) water-soluble polymer of acrylamide preferably having a generally neutral charge. By a neutral charge, I mean they desirably will not contain more than 10% carboxylic acid-containing or other negatively charged groups in substitution for the acrylamide groups, whether introduced by the original copolymerization of acrylic acid or by the hydrolysis of the amide groups in a homopolymer of acrylamide, or in any other manner; on the other hand, there should not be more than about 10% cationic, i.e. ammonium or other cationically charged, groups as may be introduced to the polymer chain by the copolymerization of dimethyl diallyl ammonium chloride, for example, with the acrylamide. While polyacrylamide having a hydrolysis of up to 25% or more of the amide groups will be operable at least to some degree in my invention, those having 10% or less hydrolysis are superior.

The manufacture of polyacrylamide in an aqueous redox or other polymerization system is known in the art and there are numerous commercially available polyacrylamides suitable for my invention having the specifications described above.

Analyses of the organic material in Florida phosphate rock shows that it generally comprises at least about 0.5% of the rock and that the largest portion of it is a porphyrin-like composition, i.e. a large multiple-plane ring compound capable of complexing with magnesium or iron, such as chlorophyll or hemataporphyrin. Occasionally, the next most abundant organic material in the wet-process reactor is the flotation reagent added to the phosphate rock slurry during the beneficiating process to help separate the undesirable portions of the phosphate rock from the desired parts. While the flotation reagent content of the slurry feed to the reactor is very difficult to monitor, the flotation reagent content can vary as the sources of rock and the beneficiating conditions are changed for various reasons. In any event, it is felt that, in spite of the extremely low pH environment in the reactor, any flotation reagents which may find their way to the reactor may contribute to the vagaries of foam formation and possibly to the occasional gross eruptions which occur, and that the polymeric additives I employ will ensure much more steady conditions. For whatever reason, the polyacrylamides seem to eliminate a large part of the unpredictability of the process, along with the foam itself.

While foaming can be and is commonly observed and observable in the phosphate rock digester, it should be remembered that such reactors can be up to 70 feet high or more, may have a volume of up to 60,000 cubic feet or more and may be under, for example, a vacuum of ten inches of mercury or greater. Visual observations through ports in the top of a closed reactor, for example, provide only a view of the surface of the foam, which obscures the rest of reaction mixture; it is difficult to estimate visually or mechanically monitor the depth of the foam in the highly active, continuously changing reaction process. Commercially reliable instrumentation for the measurement of the height and "density" of foam in the hostile interior of the reactor are not readily obtainable.

Because of the difficulties in obtaining accurate and continuous measurements of the foam, it has become accepted to employ empirical correlations of foam in the filtration operation to foam growth and height in the reactor, as well as the subjective appearance of the foam. Use of the correlations, however, is limited to a negative inference that if a given defoaming agent is not associated with carry-over losses, it will not cause a reactor foam problem. Similar correlations may be based on other empirically observable phenomena. First, if there is present an organic material which causes foam in the reactor, an inference may be raised that it will also cause foam at the filter. Second, additives for the reaction mixture having surface activity may tend to affect the growth of gypsum crystals, a significant factor if it occurs, since the slurry generally will contain about 40% gypsum.

The above more or less empirical observations and correlations are useful only as gross negative tests, i.e. a defoaming additive may be tested to determine whether it adversely affects the filtration of gypsum. My combination of polyacrylamide and a relatively small amount of conventional surface active defoamer has not demonstrated any adverse effects on the wet-process system at the concentrations employed although some side effects not relevant to the wet-process itself have been observed in a fluosilicic acid by-product manufacturing system. If such a system is employed, the user may wish to increase his use of defoamer in the reactor and/or to control the contamination of the fluosilicic acid process by other means.

Mixtures of an unhydrolyzed polyacrylamide and up to 20% sulfonated fatty acid have been found to be effective defoamers and to have better "knock-down" capability than the polyacrylamide alone. A mixture containing 5% commercial defoamer (solution of sulfonated fatty acid) and 0.95% polyacrylamide (Example VI in Table 1) was as effective in inhibiting the incipient foam on a cost basis as flocculant alone but had much better foam knock-down power once it became formed.

The evaluations shown in Table 1 were carried out in the laboratory using the following procedure: Recycle phosphoric acid (301 g, 20% $P_2O_5$) was mixed with 112 g 98% $H_2SO_4$, then diluted to 300 ml. Defoamer-free gypsum slurry (288 g.) was heated to 170° F.; an aqueous solution (0.5 g., 1%) of Nalco 7871 was added with stirring. The above-mixed acids and 150 g. of phosphate rock were added to the slurry in six equal increments during a 90-minute period 16 min/increment). Nalco 7871 (29% unhydrolyzed polyacrylamide having a molecular weight of about 15-20 million as water-swelled microspheres emulsified in a hydrocarbon carrier) was added from a tared dropping bottle as needed to control foam, i.e. to maintain the foam in the vessel at a level no higher than a few millimeters.

The quantity of Nalco 7871 effective in controlling foam in these tests (Table 1) to a height equivalent to 6-8 feet in the reactor averaged 0.46 pounds per ton of $P_2O_5$. The slurry filtration rates averaged 366 GPM/ft$^2$ and the gypsum cakes had an average of 0.46% $P_2O_5$.

TABLE 1

POLYACRYLAMIDE AS DEFOAMER
Consumption To Maintain Minimum Foam Level

| Example | Defoamer | Consumption lb./ton $P_2O_5$ |
|---|---|---|
| I | Nalco 7871 | 0.44 |
| II | Nalco 7871 | 0.48 |
| III | Nalco 7871 | 0.46 |
|  | Average | 0.46 |
| IV | 20% CCS-505* +0.8% 7871 | 17.6 |
| V | 10% CCS-505** +0.9% 7871 | 23.0 |
| VI | 5% CCS-505*** +0.95% 7871 | 19.4 |

*CCS-505 is a 50% solution of a sulfonated tall oil acid made by Westvaco; 20 grams 505 + 80 grams 1% Nalco 7871.
**10 grams CCS-505 + 90 grams 1% Nalco 7871.
***5 grams CCS-505 + 95 grams 1% Nalco 7871.

TABLE 2

| Surfactant | Molecular Weight | Ionic Character | Consumption lb./ton $P_2O_5$ |
|---|---|---|---|
| Nalco 7871 | high** | Nonionic | 0.46 |
| 7872 | high** | Slightly anionic | 0.59 |
| 7873 | high** | Moderately anionic | 0.68 |
| IDD 739 (7875) | ultra high** | Highly anionic | 0.86 |
| Aquafloc 423* (Dearborn) | high | Anionic | 0.397 |
| Separan M6700* (Dow) | very high | Anionic | 0.229 |

*Aquafloc 423 and Separan MG700 are hydrolyzed high molecular weight polyacrylamides.
**High molecular weight is over 10 million and ultra-high is over 20 million.

The results of Table 2 were obtained by a similar procedure, and demonstrate the effects of variations in anionic (hydrolyzed) character of the polyacrylamide.

It should be noted that, while a height of 6-8 feet is considered an acceptable foam level for a reactor of about 65 feet in height and carrying a capacity load of slurry, the actual foam height can be difficult to measure in a closed reactor. By "acceptable", I mean not the minimum amount of foam, but the optimum, "cost-effective", amount at which maximum benefit is achieved at minimum expense. An expedient way of monitoring foam level in the reactor is to observe the foam level in the material withdrawn from it, which as a practical matter may mean simply visually observing the filter. Through experience in at least one such commercial plant, I have concluded that the foam level on the filter should not exceed a height of about one inch.

Table 3 presents laboratory data which have been converted to plant operating terms, showing the polymer and surfactant feed rates and the flow rates at the recycle points downstream of the filter (W1, W2, W3) as well as the final filtrate flow rate. No significant foam was observed throughout the test.

BRIEF DESCRIPTION OF THE DRAWINGS

FIG. 1 presents a running history of defoamer consumption in a commercial reactor train.

FIG. 1A covers the period from August 20 to Sept. 15.

FIG. IB covers the period from September 17 to October 15. Polyacrylamide addition begun on September 10 averaged about 0.518 pounds of Nalco 7871 per ton of $P_2O_5$, enabling a reduction of 75% in defoamer consumption until September 20, on which polyacrylamide addition was discontinued until September 24, when it was resumed and again demonstrated its ability to reduce defoamer consumption. A gradual increase in defoamer usage was begun on October 14 as part of an experimental program to control carry-over in the fluosilicic acid by-product plant. Throughout the period depicted, no adverse effects were observed in the process or product, and a superior product was made throughout.

TABLE 3

| Defoamer | Cost $/lb | Consumption lb/ton $P_2O_5$ | Filtrate GPM/ft$^2$ | Filtrate gms | Filtrate % $P_2O_5$ | W1 GPM/ft$^2$ | W1 gms | W1 % $P_2O_5$ | W2 GPM/ft$^2$ | W2 gms | W2 % $P_2O_5$ | W3 gms | W3 % $P_2O_5$ | Cake gms | Cake % $P_2O_5$ |
|---|---|---|---|---|---|---|---|---|---|---|---|---|---|---|---|
| CCS-505 | 0.18 | 3.76 | 301 | 254 | 30 | — | — | — | — | — | — | — | — | — | — |
| CCS-505 | 0.18 | 3.90 | 433 | 262 | 30 | 273 | 316 | 24 | 396 | 219 | 5.2 | 314 | 0.4 | 367 | 0.56 |
| CCS-505 | 0.18 | 4.12 | 334 | 248 | 30 | 231 | 292 | 25.6 | 317 | 185 | 8.2 | 286 | 0.1 | 380 | 0.51 |
| Average | — | 3.93 | 356 | 255 | 30 | 252 | 304 | 24.8 | 356 | 202 | 6.7 | 300 | 0.25 | 374 | 0.54 |
| Nalco 7871 | 0.643 | 0.44 | 321 | 287 | 29.6 | — | — | — | — | — | — | — | — | — | — |
| Nalco 7871 | 0.643 | 0.48 | 393 | 260 | 30.4 | 228 | 302 | 23.6 | 373 | 212 | 5.6 | 279 | 3.6 | 370 | 0.45 |
| Nalco 7871 | 0.643 | 0.46 | 384 | 257 | 31.2 | 219 | 289 | 25.6 | 365 | 196 | 6.4 | 286 | 0.8 | 366 | 0.48 |
| Average | — | 0.46 | 366 | 268 | 30.4 | 224 | 296 | 24.6 | 369 | 204 | 6.0 | 282 | 2.2 | 368 | 0.46 |
| Nalco 7871 Excess | 0.643 | 0.79 | 301 | 254 | 30.4 | — | — | — | — | — | — | — | — | — | — |
| Nalco 7871 Excess | 0.643 | 1.5 | 349 | 284 | 30 | — | — | — | — | — | — | — | — | — | — |
| Nalco 7871 Excess | 0.643 | 2.3 | 380 | 267 | 30 | — | — | — | — | — | — | — | — | — | — |

TABLE 3-continued

| Defoamer | Cost $/lb | Consumption lb/ton P$_2$O$_5$ | Filtrate GPM/ft$^2$ | gms | % P$_2$O$_5$ | W1 GPM/ft$^2$ | gms | % P$_2$O$_5$ | W2 GPM/ft$^2$ | gms | % P$_2$O$_5$ | W3 gms | % P$_2$O$_5$ | Cake gms | % P$_2$O$_5$ |
|---|---|---|---|---|---|---|---|---|---|---|---|---|---|---|---|
| Nalco 7871 Excess | 0.643 | 2.3 | 335 | 307 | 27.2 | 199 | 288 | 24 | 332 | 203 | 5.6 | 287 | 3.2 | 382 | 0.60 |
| Nalco 7871 Excess | 0.643 | 2.3 | 409 | 272 | 30.8 | 233 | 290 | 25 | 321 | 196 | 7.5 | 305 | 6.8 | 375 | 0.55 |
| Nalco 7871 Excess | 0.643 | 3.03 | 362 | 256 | 29.2 | — | — | — | — | — | — | — | — | — | — |
| Average | — | 2.04 | 356 | 273 | 29.6 | 216 | 289 | 24.5 | 326 | — | — | — | — | — | — |

I claim:

1. Method of inhibiting the formation of foam in a wet-process phosphoric acid reactor during the digestion of phosphate rock by sulfuric acid under agitation and vacuum, said rock including at least about 0.5% indigenous organic matter, comprising adding to and maintaining in said reactor about one-half to about three pounds of a surfactant defoaming agent and about 0.1 pound to about 0.5 pound of a water soluble polyacrylamide per ton of P$_2$O$_5$, said polyacrylamide having a molecular weight of at least one million and being in the aqueous phase of an emulsion, the continuous phase of which comprises a hydrocarbon carrier.

2. Method of claim 1 wherein the defoaming agent and the polyacrylamide are added together.

3. Method of claim 1 wherein the polyacrylamide is substantially nonionic.

4. Method of claim 1 wherein the defoaming agent is a sulfonated tall oil acid.

5. Method of inhibiting the formation of foam in a wet-process phosphoric acid reactor during the isothermal conversion of phosphate rock to gypsum and phosphoric acid, by the addition thereto of sulfuric acid, the conversion process including the introduction of a substantial recycle stream from a filter, comprising substantially continuously adding to said reactor a slurry of phosphate rock and a stoichiometric amount of sulfuric acid, and a foam-controlling amount of surfactant defoaming agent and polyacrylamide in a ratio of about 5 to 1 to about 50 to 1, said polyacrylamide having a molecular weight of at least one million and being in the aqueous phase of an emulsion, the continuous phase of which comprises a hydrocarbon carrier.

6. Method of claim 5 wherein the polyacrylamide is substantially nonionic and has a molecular weight of at least about 15 million.

7. Method of claim 5 wherein the defoaming agent is a sulfonated tall oil.

* * * * *